3,646,102
METHOD FOR CONTINUOUSLY PREPARING POLYCARBONATE OLIGOMER

Akito Kobayashi, Kiyoshi Watanake, Yoshihiro Narita, Eiji Shiota, and Kenji Iwaoka, Yamaguchiken, Japan, assignors to Idemitsu Kosan Co., Ltd., Tokyo, Japan
No Drawing. Filed Aug. 11, 1969, Ser. No. 849,185
Claims priority, application Japan, Aug. 28, 1968, 43/61,132
Int. Cl. C08g 17/13, 17/005
U.S. Cl. 260—463
11 Claims

ABSTRACT OF THE DISCLOSURE

Polycarbonate oligomer having a molecular weight of 450 to 500 is prepared with a good reproducibility and theoretical consumption of phosgene by introducing an aqueous caustic alkali solution of a dihydroxy compound and an organic solvent for polycarbonate oligomer into a tubular reactor, forming a mixed phase stream thereof and feeding thereto phosgene to effect reaction with the mixed phase stream thereof in a parallel-current flow, while temporarily removing the heat of reaction generated at the reaction in the form of the latent heat of vaporization of the said organic solvent.

---

This invention relates to a method for continuously preparing polycarbonate oligomer, and more particularly it relates to a method for continuously preparing polycarbonate oligomer, characterized by introducing an aqueous caustic alkali solution of a dihydroxy compound and an organic solvent for polycarbonate oligomer into a tubular reactor, forming therein a mixed phase stream, and subjecting the mixed phase stream to reaction with phosgene in a parallel-current flow, while temporarily removing the heat of reaction generated at the reaction in the form of the latent heat of vaporization of the said organic solvent.

As a method for preparing a polycarbonate, there has been well known a batch-type process for obtaining a high molecular weight polycarbonate comprising introducing phosgene into a mixture of an aqueous caustic alkali solution of bisphenol A and methylene chloride with stirring to form relatively low molecular weight polycarbonate oligomer as an intermediate product, and adding thereto an aqueous caustic alkali solution, a polymerization accelerator, a molecular weight adjusting agent, etc. under stirring. On the other hand, the continuous preparation of the oligomer has been disclosed in Japanese patent publication No. 4352/66, wherein bisphenol A is reacted with phosgene in a packed column-type reactor to produce polycarbonate oligomer. However, in these conventional batch-type method and packed column-type continuous method for preparing the oligomer, the molecular weight of the oligomer cannot be controlled on the ground that the removal of the heat of reaction is difficult and the flow of the reacting liquids cannot be brought entirely into a stationary state. Thus, there is such a disadvantage that the reproducibility at the following stage of polymerization reaction is poor. Further, there is another disadvantage in these conventional methods in that quite a larger amount of phosgene is consumed compared with the theoretical amount.

As a result of studies as to a method for continuously preparing the oligomer, the present inventors have found out a method for continuously preparing a polycarbonate oligomer by introducing an aqueous caustic alkali solution of a dihydroxy compound and an organic solvent for polycarbonate oligomer into a tubular reactor, forming a mixed phase stream of these two liquids in the said reactor, adding phosgene to the said reactor, causing the reaction to be effected in an atomized state, and temporarily removing the heat of reaction generated at the reaction in the form of latent heat of vaporization of the said organic solvent, while keeping the reaction temperature below the boiling point of the said organic solvent. It has also been found out that the phosgene can be consumed almost stoichiometrically in the present method.

In the present tubular reactor, the mixed phase stream of the aqueous caustic alkali solution of a dihydroxy compound and the organic solvent are brought into an atomized flow by being brought in contact with phosgene, whereby the phosgenation reaction of the dihydroxy compound with phosgene proceeds in a very short period of time. A part of the said organic solvent is vaporized by the heat of reaction evolving at the phosgenation reaction of a dihydroxy compound and phosgen, and thus the organic solvent solution containing the oligomer as a reaction product and the aqueous solution containing the resulting alkali chloride are brought into an atomized state.

The vaporized organic solvent is slowly condensed toward the outlet of the reactor by cooling the outside of reactor, and changed from the atomized state to a two-liquid, mixed phase stream of liquid organic solvent phase and aqueous solution phase. In this manner, the oligomer is completely dissolved in the organic solvent phase, and taken out of the reactor together with the aqueous solution containing dissolved alkali chloride and remaining caustic alkali. Phosgene may be fed at one inlet, but in the case of a large reactor, it is preferably fed at more than one inlet so that local run-away reaction can be prevented, and that excessive consumption of phosgene can be also prevented.

Another advantage of the present invention is that the molecular weight of the oligomer can be controlled by properly selecting the reaction condition in the tubular reactor. For example, when bisphenol A is reacted with phosgene using methyl chloride as a solvent, the oligomer having molecular weight of 450 to 500 can be obtained with a good reproducibility by keeping the final reaction liquid weakly alkaline. Such oligomers having a definite range of molecular weights have not been obtained by the conventional batch-type or the packed column-type continuous method. That is to say, in the batch-type method, the molecular weight of the oligomer varies batch by batch. Further, even in the continuous method, it is impossible to obtain the uniform oligomer owing to the difficulty in the temperature control. The uniformity of the oligomer has a considerable influence upon that of the polycarbonate obtained finally in the following polymerization reation. The polycarbonate having a desired high molecular weight can be obtained with a very good reproducibility from the oligomer obtained by using the tubular reactor of the present invention. Such reproducibility of the polymerization reaction could not be expected in case where the oligomer was obtained by the conventional batch-type or the packed column-type continuous method in the polymerization.

As for the length of the cooling part of the tubular reactor in the present invention, it is necessary that it should be long enough to condense completely the vaporized organic solvent and to dissolve oligomer completely into the said organic solvent. Accordingly, the tube length is very large as compared with the tube diameter (i.e. 8 < tube length/tube diameter). The outside of the said tube can be cooled by a jacket or a box-type vessel.

It is evident that the oligomer obtained by the method of the present invention has hydroxyl groups (—OH) and chloroformate groups (—OCOCl) at the terminals of the molecule, and a ratio of the hydroxyl group to the chloroformate group varies depending upon the feeding rate of phosgene, the concentration of an aqueous caustic alkali solution of the dihydroxy compound, reaction temperature, etc., and in most cases, the chloroformate group is present more than the hydroxyl group.

The high molecular weight polycarbonates can be obtained by adding an aqueous caustic alkali solution etc. to the oligomer to effect the condensation polymerization by dehydrochlorination.

As for the temperatures of an aqueous caustic alkali solution of the dihydroxy compound and an organic solvent fed to the tubular reactor according to the present invention, they must be so selected as to be a little lower than the boiling point of the organic solvent so that the solvent may form smoothly an atomized stream state.

Further, in the present invention, the flow rates of an aqueous caustic alkali solution of the dihydroxy compound and phosgene to be fed to the tubular reactor must be controlled so that the pH of the aqueous solution phase to be taken out of the tubular reactor may be weakly alkaline. If the pH is acidic, it is evident that the reaction of phosgene with water has taken place considerably, and such reaction will make the method economically disadvantageous.

Examples of the dihydroxy compounds used in the present invention are such 4,4'-dihydroxydiphenylalkanes as 4,4'-dihydroxydiphenyl-2,2-propane and 4,4'-dihydroxydiphenyl-1,1-butane or the halogen derivatives thereof.

Examples of the organic solvents used in the present invention are such chlorinated hydrocarbons capable of dissolving polycarbonate oligomer and high molecular weight polycarbonate of the said dihydroxy compound as methylene chloride, tetrachloroethane, 1,2-dichloroethylene, chloroform, trichloroethane, dichloroethane, and chlorobenzene, or dioxane, tetrahydrofuran, or acetophenone, alone or the mixtures thereof.

Examples of the caustic alkalis used in the present invention are such strongly basic hydroxides as sodium hydroxide and potassium hydroxide.

The phosgene employed in the present invention can be in either liquid or gaseous state or in the state of being dissolved in the said organic solvent.

The present invention will be explained hereinafter in more detail.

EXAMPLE 1

60 kg. of bisphenol A was dissolved in 400 l. of 5% caustic soda aqueous solution. Then, the aqueous caustic soda solution of bisphenol A and methylene chloride kept at room temperature were fed to a tubular reactor having an inner diameter of 10 mm. and a tube length of 10 m. through an orifice plate at the flow rates of 138 l./hr. and 69 l./hr. respectively. Phosgene was fed thereto in a parallel-current flow at the flow rate of 10.7 kg./hr., and continuously subjected to reaction for 2 hours. The tubular reactor had a jacket, and cooling water was passed through the jacket part to keep the outlet temperature of the reaction liquid at 25° C. Thus, the pH of the effluent liquid came to be weakly alkaline. As a result, the reacted liquid was readily separated into two phases, i.e. the aqueous phase (253 l.) and the methylene chloride phase containing polycarbonate oligomer (146 l.) by setting. The oligomer thus obtained had a mean molecular weight of 430.

Then, 500 cc. of methylene chloride was freshly added to 500 cc. of the said methylene chloride phase containing the oligomer and the resulting mixture was subjected to the following polymerization in a 2 l. separable flask at 20° C. for 2 hours with vigorous stirring together with 350 cc. of 10% aqueous solution of caustic soda, 41 g. of bisphenol A, 0.4 g. of polymerization accelerator, i.e., triethylamine, and 0.8 g. of molecular weight-adjusting agent, i.e., phenol. As a result, polycarbonate having a means molecular weight of 25,100 was obtained. The amount of phosgene consumed was 102% of the theoretical amount. Table 1 shows the result of this Example 1 together with those of the examples which follow.

EXAMPLE 2

The reaction was carried out as in Example 1, with the only exception that the outlet temperature of the reaction liquid from the tubular reactor was kept at 27° C.

EXAMPLE 3

The reaction was carried out as in Example 1 with the only exception that the outlet temperature of the reaction liquid from the tubular reactor was kept at 30° C.

COMPARATIVE EXAMPLE 1

1.5 l. of the same aqueous caustic soda solution of bisphenol A as in Example 1 and 0.75 l. of methylene chloride were added to a 3 l. separable flask and 140 g. of phosgene was fed thereto over a period of 80 minutes with stirring. The reaction temperature was adjusted to 25° C. by cooling with water. The liquid was weakly alkaline after the completion of this reaction. The reacted liquid thus obtained was readily separated into two phases, i.e. an aqueous phase (1350 cc.) and a methylene chloride phase (900 cc.) by settling.

Then, 500 cc. of the methylene chloride phase of oligomer thus obtained was polymerized under the same conditions as in Example 1, whereby a high molecular weight polycarbonate was obtained, but 6 g. of unreacted bisphenol A was found (Comparative Example 1—1).

To check the reproducibility of the polycarbonate production, the reaction was twice repeated under the same conditions as above, whereby 1 g. (Comparative Example 1–2) and 8 g. (Comparative Example 1–3) of unreacted bisphenol A were found, respectively. Results are shown in Table 1. The amounts of phosgene consumed were by 15 to 20% larger than those in Examples 1, 2 and 3, and the polycarbonates thus obtained had much variation in means molecular weight.

COMPARATIVE EXAMPLE 2

A vertical column having an inner diameter of 25 mm. and a length of 1 m. and provided with a water cooling jacket was packed with 7 mm. Raschig rings, and the same aqueous caustic soda solution of bisphenol A as in Example 1, and methylene chloride were fed to the packed column from the upper part of the column at the flow rates of 3.6 l./hr. and 1.8 l./hr., respectively. On the other hand, phosgene was fed to the packed column from the lower part at a flow rate of 324 g./hr. and allowed to come in contact with the aqueous caustic soda solution and methylene chloride in a counter-current flow. The reaction was continuously carried out at 25° C. for 2 hours. The reaction liquid obtained from the lower part of the packed column was readily separated into two phases, i.e. an aqueous phase (5 l.) and a methylene chloride phase (6.6 l.) by settling.

Then, 500 cc. of the methylene chloride phase of oligomer thus obtained was polymerized under the same conditions as in Example 1, whereby high molecular weight polycarbonate was obtained, but 10 g. of unreacted bisphenol A was found (Comparative Example 2-1).

To check the reproducibility in the preparation of the polycarbonate, the reaction was repeated twice more under the same conditions as above, whereby 6 g. (Comparative Example 2—2) and 7 g. (Comparative Example 2-3) of unreacted bisphenol A were found, respectively. The amounts of phosgene consumed were by about 15% larger than those in Examples 1, 2 and 3, and the polycarbonates thus obtained had much variation in mean molecular weight.

TABLE 1

| | | Oligomer preparation | | | Polymerization, mean molecular weight of polycarbonate |
|---|---|---|---|---|---|
| | Process type for preparing oligomer | Reaction temp. (°C.)[1] | Mean molecular weight of oligomer | Consumption of phosgene (percent)[2] | |
| Example 1 | Tubular reactor, continuous | 25 | 430 | 102 | 25,100 |
| Example 2 | do | 27 | 450 | 103 | 24,900 |
| Example 3 | do | 30 | 500 | 103 | 25,100 |
| Comparative Example 1-1 | Vessel epuiped with an agitator, batch-type | 25 | 2,500 | 123 | 33,200 |
| Comparative Example 1-2 | do | 25 | 3,100 | 119 | 29,000 |
| Comparative Example 1-3 | do | 25 | 2,800 | 125 | 24,600 |
| Comparative Example 2-1 | Packed column, continuous | 25 | 1,900 | 121 | 26,400 |
| Comparative Example 2-2 | do | 25 | 1,500 | 118 | 25,100 |
| Comparative Example 2-3 | do | 25 | 1,700 | 119 | 29,200 |

[1] In Examples 1, 2 and 3 and Comparative Examples 2-1, 2-2 and 2-3 the reaction temperature is that of effluent liquid from the reactor. In Comparative Examples 1-1, 1-2 and 1-3, the reaction temperature is that of thermostat used for the controlling temperature.

[2] Consumption of phosgene = $\dfrac{\text{amount (moles of phosgene consumed}}{\text{theoretical amount (moles) of phosgene}} \times 100$ where the theoretical amount (moles) of phosgene is equal to moles of bisphenol A which was reacted with phosgene.

What is claimed is:

1. A method for continuously preparing polycarbonate oligomer which comprises:
   (a) introducing an aqueous caustic alkali solution of dihydroxy compound and an organic solvent into a tubular reactor;
   (b) said organic solvent being capable of dissolving said polycarbonate oligomer;
   (c) forming a mixed phase stream of the organic solvent and aqueous solution in said tubular reactor;
   (d) feeding phosgene thereto and causing said phosgene to react with said mixed phase stream in a parallel-current flow while allowing the heat of reaction which evolves at the phosgenation reaction to vaporize organic solvent;
   (e) and then condensing the vaporized organic solvent near the reactor outlet by cooling the outside of the reactor.

2. A method according to claim 1, wherein the phosgene is fed to the tubular reactor at more than one inlet.

3. A method according to claim 1, wherein the aqueous caustic alkali solution of dihydroxy compound and phosgene are fed to the tubular reactor at such a rate that a pH of an aqueous effluent liquid taken out of the tubular reactor is alkaline.

4. A method according to claim 1, wherein the aqueous caustic alkali solution of dihydroxy compound and the organic solvent are fed to the reactor at a temperature a little lower than the boiling point of the organic solvent.

5. A method according to claim 1, wherein the dihydroxy compound is 4,4'-dihydroxydiphenylalkane or halogen derivative thereof.

6. A method according to claim 1, wherein the dihydroxy compound is 4,4'-dihydroxydiphenyl-2,2-propane, 4,4'-dihydroxydiphenyl-1,1-butane or halogen derivative thereof.

7. A method according to claim 1, wherein the organic solvent is methylene chloride, tetrachloroethane, 1,2-dichloroethylene, chloroform, trichloroethane, dichloroethane, chlorobenzene, dioxane, tetrahydrofuran or acetophenone, alone or the mixture thereof.

8. A method according to claim 1, wherein the caustic alkali is sodium hydroxide or potassium hydroxide.

9. The method of claim 1 wherein the reaction of phosgene and the mixed phase stream is effected in an atomized state, and the temperature of the reaction is kept below the boiling point of said solvent.

10. The method of claim 1 wherein the phosgene is fed to the tubular reactor in liquid or gaseous state or in the state of being dissolved in an organic solvent selected from the group of methylene chloride, tetrachloroethane, 1,2-dichloroethylene, chloroform, trichloroethane, dichloroethane, chlorobenzene, dioxane, tetrahydrofuran, acetophenone, and mixtures thereof.

11. The method of claim 1 wherein the polycarbonate oligomer has a molecular weight of 450 to 500.

References Cited

UNITED STATES PATENTS 3,133,044   5/1964   Allen et al. _____ 260—47

FOREIGN PATENTS 923,192   4/1963   Great Britain.

LEWIS GOTTS, Primary Examiner

D. G. RIVERS, Assistant Examiner

U.S. Cl. X.R.

260—47 XA, 77.5 D